April 6, 1954
L. J. CARPEZZI
2,674,465
DEVICE FOR ALIGNING AUTOMOBILE WHEELS
Filed Sept. 9, 1952
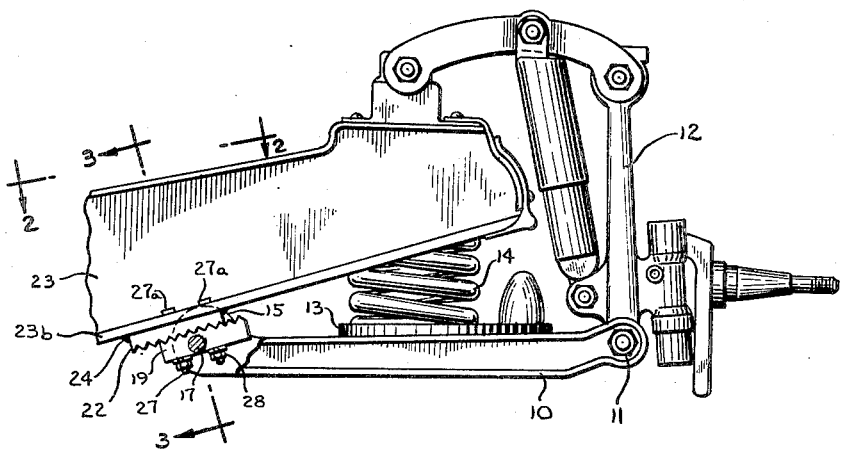
INVENTOR.
LEO JOSEPH CARPEZZI
BY
Van Deventer & Shively
ATTORNEYS Patented Apr. 6, 1954

2,674,465

UNITED STATES PATENT OFFICE 2,674,465

DEVICE FOR ALIGNING AUTOMOBILE WHEELS

Leo Joseph Carpezzi, Brooklyn, N. Y.

Application September 9, 1952, Serial No. 308,595

1 Claim. (Cl. 280—96.2)

The present invention relates to a device for aligning automobile wheels and it consists in the combinations, constructions and arrangements of parts herein described and claimed.

This application is a continuation-in-part of application Serial Number 167,228, filed on June 9, 1950, now abandoned.

Generally the invention comprises a device whereby the desired camber angle of knee-action equipped automobile wheels may be secured. A pair of plates is affixed to the underside of the chassis of the automobile and the plates are each provided with transversely extending serrations. The pivot shaft of the conventional lower control arms has formed thereon, or suitably seamed thereto, a pair of plates, each provided with transversely extending serrations and each provided with a pair of vertical slots which are each elongated in a direction transversely of the shaft. The plates carried by the chassis and the plates carried by the shaft are adapted to be locked together in selected positions by means of bolts extending through the slots and through openings formed in the chassis plates therefor so that the shaft may be adjusted laterally with respect to the chassis to thereby alter the camber angle of the automobile wheels.

It is accordingly an object of the invention to provide a device of the character set forth which is simple in construction, inexpensive to manufacture and yet effective and efficient in use.

Another object of the invention is the provision of a device of the character set forth having novel adjustable locking plates forming a part of the invention.

A further object of the invention is the provision of novel means for altering the camber angle of knee-action equipped automobile wheels.

A further object is to provide two pairs of serrated plates and a shaft to which one of said pairs is attached to be sold as a unit accessory for use with an automobile having a conventional knee action front wheel construction.

Other and further objects of the invention will become apparent from a reading of the following specification taken in conjunction with the drawing, in which:

Figure 1 is a side view partly in section of an embodiment of the invention;

Figure 2 is a plan view thereof;

Figure 3 is a sectional view taken along line 3—3 of Figure 1,

Figure 4 is a plan view of a special shaft having secured thereto serrated plates and used with the invention; and Figure 5 is a plan view of a chassis plate forming a part of the invention.

Referring more particularly to the drawing, there is shown therein a portion of the knee-action assembly of an automobile so equipped and having a pair of lower control arms 10 which converge toward their outer ends to form knuckle supports 11 and which have riveted thereto a platform 13 to provide a seat for a conventional compression spring 14.

The inner ends 15 of the arms 10 are each threaded transversely therethrough for the threaded reception therein of bushing nuts 16 within each of which is threaded the rounded ends 17 of shaft 18.

The shaft 18 has secured thereto in any manner, or formed integrally therewith, the lower locking plates 19, having transversely extending serrations 20 formed in the upper faces thereof, and each of the plates 19 is provided with a pair of vertical slots 21 which are aligned in transverse relation to the axes of the shaft 18 and each of which extends in a lateral direction with respect to the shaft 18.

A pair of upper plates 22 is affixed to the underside of the front cross member 23 of the chassis of the automobile in any suitable manner as by welding at 24 or by bolts or the like, and each of the plates 22 is provided with a pair of circular openings 25 to receive bolts 27.

The plates 22 and the plates 19 are so positioned as to vertically oppose each other and the plates 22 are provided on their undersides with serrations 26 which are adapted to cooperate with the serrations 20 in a manner hereinafter to be described. Bolts 27, equipped with nuts 28, extend through the slots 21 and the openings 25 to interconnect the plates. The upper heads of said bolts are shaped as shown at 27a so as to fit between the upstanding side 23a of the cross member 23 and its bottom plate 23c and the flange 23b thereon to prevent these bolts from turning should the nuts loosen. Obviously any other suitable means can be used for this purpose.

It will be seen that said bolts 27 may extend through the front member 23 of the chassis as well as plates 19 and 22, to secure said parts together in adjusted position.

In operation it will be apparent that when it is desired to alter the camber of an automobile wheel equipped with the present apparatus, it is only necessary to loosen the nuts 28 to such extent that the serrations 20 may be disengaged from the serrations 26 in the upper plates and to thereafter move the wheel to its proper alignment which action will cause the shaft 18, and consequently the plates 19, to be moved to the right or left as viewed in Figure 1. When such alignment has been completed the serrations 20 and 26 then opposing one another way may be again allowed to interleave and the nuts 28 again tightened. Thus it will be seen that the camber of knee-action automobile wheels may be very quickly corrected and the assembly permanently locked together in adjusted position. This adjustment obviates the common practice of bending the arm 12.

It will be seen from the foregoing that the invention cannot only be used by the automobile manufacturer but can be furnished the trade for use on existing automobiles, said plates and shaft forming an accessory that can be easily installed in the field by auto repair shops, the invention then constituting a unit accessory to be packaged and sold as such.

While but one form of the invention has been shown and described herein, it will be readily apparent to those skilled in the art that many minor modifications may be made without departing from the spirit of the invention or the scope of the appended claim.

What is claimed is:

An automobile wheel aligning means for attachment to and the combination with a conventional knee action apparatus for motor vehicles having a front transverse frame member comprising an inverted channel having laterally projecting side flanges along its lower edges and said knee action including a pair of lower control arms; a bottom plate secured to the underside of said side flanges, a transversely extending shaft having ends threadedly connecting with the inner ends of said control arms, a pair of lower plates integral with said shaft, each of said plates having an upper face provided with serrations extending parallel to the axis of the shaft, a pair of upper plates each having a flat top face positioned, and in contact throughout the entire area thereof, against the under surface of said chassis bottom plate, said upper plates having their lateral portions disposed across the underside of the flanged portion of said chassis member and each having the serrated face of a lower plate opposed thereto, said upper plates further being spaced apart to lie within the overall transverse dimension of the chassis member, said upper plates being permanently immovably fixed to said chassis member bottom plate, each of said upper plates having serrations in its under face extending parallel to and interengaging with the serrations of the opposing lower plate, and means adjustably interconnecting said upper and lower plates, including slots formed in said lower plates and extending transversely with respect to the longitudinal axis of said shaft, aligned openings formed through said flanges, bottom plate and the upper plates, bolts extending through said aligned openings and the slots of the lower plates, and a nut for each of said bolts.

References Cited in the file of this patent

UNITED STATES PATENTS

| Number | Name | Date |
|---|---|---|
| 2,065,071 | Harris | Dec. 22, 1936 |
| 2,299,087 | Goetz | Oct. 20, 1942 |
| 2,299,935 | Slack et al. | Oct. 27, 1942 |
| 2,321,832 | Leighton | June 15, 1943 |
| 2,605,118 | Booth et al. | July 29, 1952 |

FOREIGN PATENTS

| Number | Country | Date |
|---|---|---|
| 455,094 | Germany | Jan. 25, 1928 |